US009043771B1

(12) United States Patent  (10) Patent No.: US 9,043,771 B1
Vardhan et al.  (45) Date of Patent: May 26, 2015

(54) SOFTWARE MODIFICATION METHODS TO PROVIDE MASTER-SLAVE EXECUTION FOR MULTI-PROCESSING AND/OR DISTRIBUTED PARALLEL PROCESSING

(75) Inventors: Harsh Vardhan, Fremont, CA (US); Athanasius W. Spyrou, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1107 days.

(21) Appl. No.: 11/771,850

(22) Filed: Jun. 29, 2007

(51) Int. Cl.
*G06F 9/45* (2006.01)

(52) U.S. Cl.
CPC .................................. *G06F 8/4435* (2013.01)

(58) Field of Classification Search
None
See application file for complete search history.

(56) References Cited

U.S. PATENT DOCUMENTS

| | | | | | |
|---|---|---|---|---|---|
| 4,862,350 | A | * | 8/1989 | Orr et al. ......................... | 709/213 |
| 5,121,498 | A | * | 6/1992 | Gilbert et al. ................... | 717/149 |
| 5,726,902 | A | * | 3/1998 | Mahmood et al. .............. | 716/102 |
| 5,956,257 | A | * | 9/1999 | Ginetti et al. ................... | 716/103 |
| 6,341,371 | B1 | * | 1/2002 | Tandri ............................. | 717/158 |
| 6,496,890 | B1 | * | 12/2002 | Azevedo et al. ................ | 710/110 |
| 6,606,677 | B1 | * | 8/2003 | Okbay et al. .................... | 710/262 |
| 2004/0003386 | A1 | * | 1/2004 | Tal et al. .......................... | 717/160 |
| 2006/0184819 | A1 | * | 8/2006 | Takagi .............................. | 714/4 |
| 2007/0130568 | A1 | * | 6/2007 | Jung et al. ....................... | 718/104 |
| 2010/0058271 | A1 | * | 3/2010 | Correale et al. ................. | 716/12 |

OTHER PUBLICATIONS

Snider et al. "Attacking the Semantic Gap Between Application Programming Languages and Configurable Hardware", 2001, ACM, pp. 115-124.

Patil et al. "Efficient Circuit Partitioning Algorithms for Parallel Logic Simulation", 1989, ACM pp. 361-370.
Geer, David. "Chip Makers Turn to Multicore Processors", May 2005, IEEE Computer Society, pp. 11-13.
Maurer, Peter M. "Two New Techniques for Unit Delayed Compiled Simulation", 1992 IEEE Transactions on Computer Aided Design, vol. 11, No. 9, Sep. 1992, pp. 1120-1130.
Peter M. Lee, Shinji Ito, Takeaki Hashimoto, Junji Sato,Tomomasa Touma, and Goichi Yokomizo, "A Parallel and Accelerated Circuit Simulator with Precise Accuracy", 2002, IEEE, Proceedings of the 15th International Conference on VLSI Design, 6 pgs.
Luben Boianov and Innes Jelly, "Distributed Logic Circuit Simulation on a Network of Workstations", 1995, IEEE, pp. 304-310.
Robert Kramer et al; "The Combining DAG: A Technique for Parallel Data Flow Analysis"; Aug. 1994; IEEE Transactions on Parallel and Distributed Systems, vol. 5, No. 8; pp. 805-813.
Goering, Richard; "Statistical Pioneer Rolls Threaded Timing Analysis"; EETimes.com; May 28, 2007., 2 pages.

\* cited by examiner

*Primary Examiner* — Li B Zhen
*Assistant Examiner* — Evral Bodden
(74) *Attorney, Agent, or Firm* — Alford Law Group, Inc.; Tobi Clinton

(57) ABSTRACT

In one embodiment of the invention, a method is disclosed for modifying a pre-existing application program for multi-processing and/or distributed parallel processing. The method includes searching an application program for a computational loop; analyzing the computational loop to determine independence of the computational transactions of the computational loop; and replacing the computational loop with master code and slave code to provide master-slave execution of the computational loop in response to analyzing the computational loop to determine independence of the computational transactions of the computational loop. Multiple instances of the modified application program are executed to provide multi-processing and/or distributed parallel processing.

20 Claims, 10 Drawing Sheets

```
Initial (non-parallel) implementation of the loop to perform
compute transactions.

While (transactions remain) {
        Get a transaction "X"
        Perform transaction "X"
       Store/Use result
}
```

*FIG. 3A*

```
Parallel implementation of the same loop

On the Master:
Create slave software instances
While (transactions remain or results are pending) {
   If (transactions remain) {
     Get a transaction "X"
     Send transaction to a free server
     Mark server as busy
   }
   If (all servers are busy or results pending) {
     Wait for one result
     Get result
    Store/Use result
   }
}
```

*FIG. 3B*

```
On the Slaves:

Wait for a transaction from the master
Perform transaction
Send result to the master
Wait for next transaction
. . .
```

*FIG. 3C*

```
601 ─── listOfNets nets;
602 ─── initialize (nets) ;
604 ─── for (i=0; i< nets.count() ; ++i) {
605 ───     reductionEngine    reducer;
606 ───     reducedNetworkModel  model;

607 ───     // Get a net
           net = nets.element (i) ;

608 ───     // Set options on how the net should be reduced
           reducer.setComputationOptions () ;

609 ───     // Set options on how the net should be reduced
           reducer.initialize (net) ;

//Compute the reduced model for the net
610 ───     model = reducer.computeModel () ;
611 ───     net.annotateModel (model) ;
       }
```

FIG. 6A

```
601 ~~ listOfNets              nets;
622 ~~ listOfSoftwareCopies    engines;

602 ~~ initialize (nets);
```

FIG. 6B-1

```
        // Start the different slave processes we will be using at
        this stage.  For this particular loop, the slaves are not
        // required to load any data and can just run based on the
        commands sent over the networking sockets.
        // In other cases, the slaves may be required to load up
        some or all of the design data.

623 ~~ engines.initialize();

604' ~~ for (i=0; i<nets.count() ; ++i)  {
606 ——      reduceNetworkModel   model;
624 ——      char                 *reductionJob;

// Get a net
607 ——      net = nets.element (i) ;

// create a job for the slave
625 ——      reductionJob = getNetReductionJob (net) ;

// if slaves are free send a job to the slave

626 ——      if (oneSlaveIsFree () ) {
627 ——          slave = getFreeSlave () ;
628A ——         dispatchReductionJobToSlave (slave,  reductionJob) ;
629A ——         markTheSlaveAsBusy (slave) ;
                // keep track of which slave got which net.
630A ——         store  (net.name () , slave)
            }

631 ——      else {
632A ——         result = waitForOneResult () ;
633A ——         model = getModelFromResult (result) ;
634A ——         net = getNetForResult (result) ;
611A ——         net.annotateModel (model) ;
635A ——         slave = getSlaveForResult (result) ;
636A ——         markTheSlaveAsFree (slave) ;
628B ——         dispatchReductionJobToSlave (slave,  reductionJob) ;
629B ——         markTheSlaveAsBusy (slave) ;
                    // keep track of which slave got which net
630B ——         store (net.name () , slave);
            }
        }
```

```
       // In the end, handle the case that we have sent over all
       the jobs but
       // are still waiting for results 637 ──── while (allSlavesAreNotFree) {
632B ────    result = waitForOneResult ();
633B ────    model = getModelFromResult (result) ;
634B ────    net = getNetForResult (result) ;
611B ────    net.annotateModel (model) ;
635B ────    slave = getsSlaveForResult (result) ;
629C ────    markTheSlaveAsFree (slave) ;
             }

639 ──── killSlaves ();
```

```
650 ~~ forever () {
            // The slave sleeps here until it gets something
651 ~~~~~~ command = listenForCommands () ;

653 ~~~~~~~~~~~ char *results;
                // Here command is the received command.
                // In this particular example, the only commands
    being received are
                // commands to reduced a net.  All the information
    about the net being
                //reduced is encapsulated in the command itself.

654 ~~~~~~~~~~~~~ results = doCommand (command) ;
655 ~~~~~~~~~~~~~ sendResultBackToMaster (result) ;
            }
    }

656 ~~char *
657 ~~doCommand (char *reductionCmd)
            {
605 ~~~~~~~~~ reductionEngine reducer;
606 ~~~~~~~~~ reduceNetworkModel   model ;
658 ~~~~~~~~~ char *optionCmd,  *initCmd ;

// Break  the command up into it's relevant pieces (this
    may not be necessary
            // for all cases but is shown here for purposes of
    clarity) .

659 ~~~~~~~ optionCmd = getOptionCmd (reductionCmd) ;
660 ~~~~~~~ initCmd = getInitCmd (reductionCmd) ;

661 ~~~~~~~ reducerEngine.setComputationOptions (optionCmd) ;
662 ~~~~~~~ reducerEngine.initialize (initCmd) ;

610'~~~~~~ model = reducer.computeModel () ;
663 ~~~~~~~ result = convertModelToString (model) ;
664 ~~~~~~~ return result;
            }
```

SOFTWARE MODIFICATION METHODS TO PROVIDE MASTER-SLAVE EXECUTION FOR MULTI-PROCESSING AND/OR DISTRIBUTED PARALLEL PROCESSING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software as described below and as shown in the drawings of the figures: Copyright © 2007, Cadence Design Systems, Inc., All Rights Reserved.

FIELD

The embodiments of the invention relate generally to multi-processor computer systems and parallel processing. More particularly, the embodiments of the invention relate to methods of modifying software application programs for parallel processing or distributed computing.

BACKGROUND

Application software has typically been written to be executed on a single computer system. However with increasing complexity of technology products, such as integrated circuits, computational demands in product design have also increased. Execution of application software to design a complex product using a single computer system may take quite some time.

Multi-threading has been used by application software to utilize more than one processor in a single computer system to speed execution time. With multi-threading, a single copy of an application program is run on multiple processors using shared memory with different threads of execution. It is impractical to share a fast memory space across a network to execute an application. Thus with multi-threading using a shared memory model, computational transactions of the application program cannot be readily distributed to other computer systems across a network.

Moreover with multi-threading, the application software program needs to be thread safe. For most legacy software applications of reasonable complexity, it is difficult if not impossible to make previously written software to be thread-safe. Even if the issue of thread-safety is adequately addressed, multithreaded application software may still also experience thread deadlocks. Thread deadlocks may occur when two or more threads are competing for the same resource, such as memory space. Thread deadlocks can vary based on the machine type, speed, operating system etc. Due to the temporal nature of thread deadlocks, they can be extremely hard to debug. This makes multi-threaded application software difficult to maintain/fix when bugs are encountered. Additionally, software bugs in multi-threaded programs are very hard to debug since the behavior of multi-threaded software in the debugger is inherently different from its behavior in a real-time environment.

Moreover, multi-threading software techniques do not lend themselves well to scaling since the number of threads that can be run is limited by the number of processors (e.g., 2-10) on a single machine which is typically less than the number of total processors available (e.g., 100-10000) in a large organization.

New application software may be written from scratch for utilizing multi-processing across a distributed computer network. However, legacy application software requires a substantially complete software rewrite to utilize multi-processing software techniques. A complete software rewrite of legacy application software for multiple processing is a time-consuming process and may be unrealistic given time and budget constraints. The resources required to achieve a substantially complete software rewrite of legacy application software may not be economically viable.

BRIEF DESCRIPTIONS OF THE DRAWINGS

FIG. 3A illustrates pseudo-code for an exemplary non-parallel implementation of a computational loop to perform compute transactions.

FIG. 3B is master pseudo-code added to an application program to process a computational loop of compute transactions by multi-processing and/or distributed parallel processing.

FIG. 3C is slave pseudo-code added to the application program to process one compute transaction of a computational loop to support multi-processing and/or distributed parallel processing.

FIG. 6A is exemplary code of an exemplary procedure in an application program with a computational loop without multi-processing or distributed parallel processing upon which embodiments of the invention may be performed.

FIG. 6B is exemplary master code for the exemplary procedure of FIG. 6A to perform the computational loop using multi-processing and/or distributed parallel processing.

FIG. 6C is exemplary slave code for the exemplary procedure of FIG. 6A with the computational loop unrolled in order to perform the procedure as a single computational transaction to support multi-processing and/or distributed parallel processing of the computational loop.

DETAILED DESCRIPTION

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, software, and apparatus have not been described in detail so as not to unnecessarily obscure aspects of the embodiments of the invention.

INTRODUCTION

It is desirable to modify legacy application software in a limited manner so that it can take advantage of parallel or multi-processing using multiple processors to execute more efficiently so as to decrease software runtime of pre-existing application software. The pre-existing application software may be complex technical or business programs, such as a computer aided design tool for integrated circuit design. In some embodiments of the invention a method is disclosed for efficient parallel processing of computational loops using multiple instances of a software system or components thereof and standard networking communication protocols. A programming method is disclosed where a large software system runs multiple copies of the application software in a master-slave manner for multi-processing (e.g., on the same computer) and/or distributed parallel processing (e.g., on multiple computers). These multiple software instances communicate with each other in an efficient fashion to provide increased computational performance. Pre-existing software is modified in a minimally invasive way, ameliorating the risk that is potentially involved in re-writing large software systems for multi-processing and/or distributed parallel processing. The methods disclosed can be applied to computation intensive software where a task can be broken down into smaller sub-tasks each of which can then be done by a different "instance" of the software system executed by another processor potentially running on a different machine. The different instances of the software system communicate using standard networking communication protocols.

Figure 1:
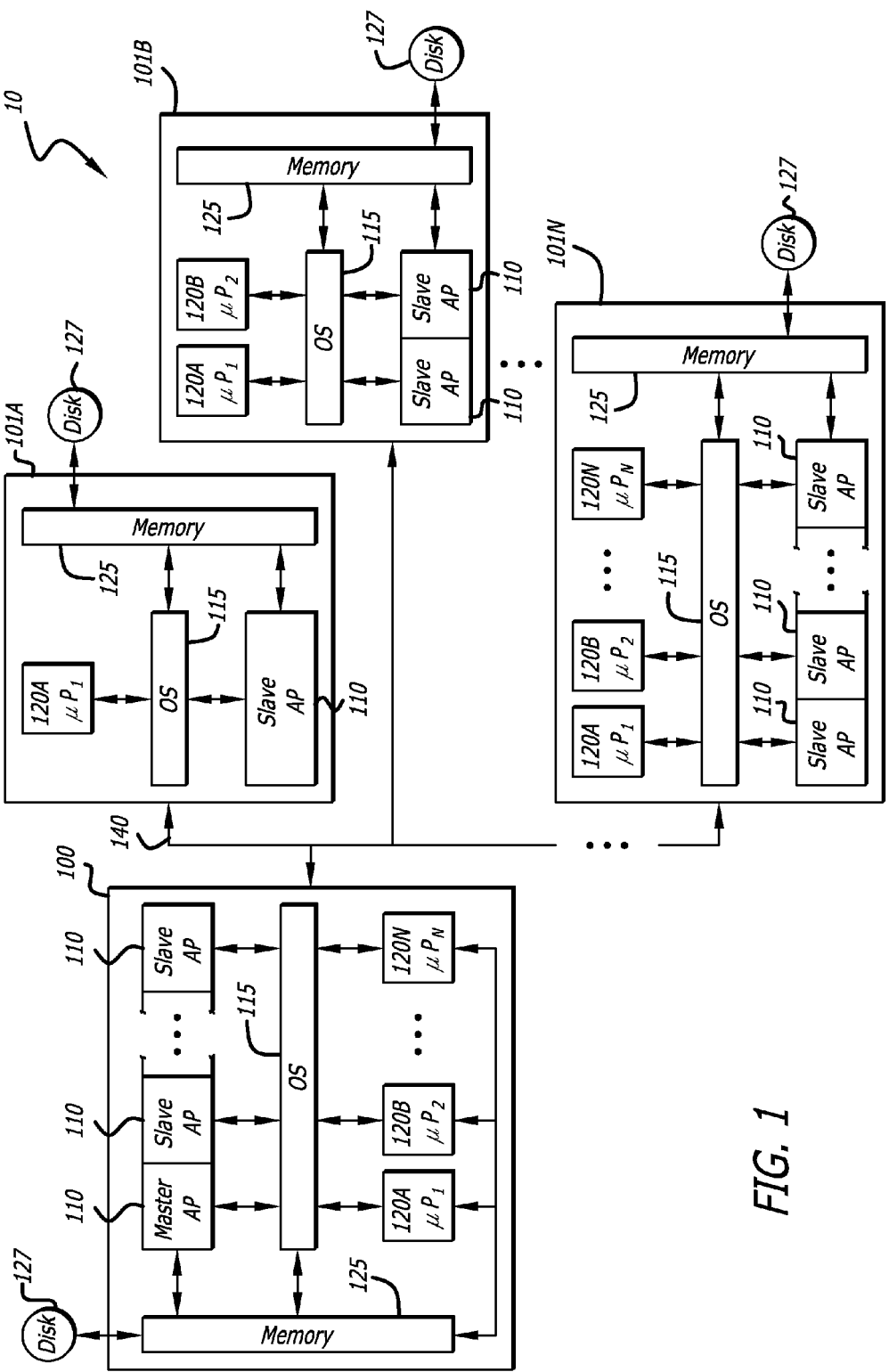
FIG. 1 is a block diagram of a computer network for multi-processing and/or distributed parallel processing of the computational loops in an application program.

Referring now to FIG. 1, a block diagram of a networked distributed computer system 10 is illustrated. The distributed computer system 10 includes computer systems 100, 101A-101N coupled together through a network 140. The computer systems 100, 101A-101N may optionally be referred to as servers. The network 140 coupling the computer systems 100, 101A-101N together may be a local area network (LAN), a wide area network (WAN), or a combination thereof.

Each of the computer systems 100, 101A-101N may receive a copy of an application program 110 to execute as described further herein. Each of the computer systems includes an operating system (OS) 115, one or more processors 120A-120N, and a storage device 125, such as memory and/or virtual memory. Each of the computer systems may further include a disk storage device 127 such as a magnetic hard drive or optical disk drive for example. A copy of the application program 110 may be stored on the disk storage device 127 of one or more of the computer systems, such as the master computer 100, to be copied into memory upon execution as the master and slave instances of the application software 110. While each computer system may have one or more processors, the computer system 101A is illustrated as having only a single processor 120A and the computer system 101B is illustrated as having only two processors 120A-120B.

The operating system (OS) 115 of the computer system 100 has a list of its one or more processors 120A-120N that it can use to execute program instructions. The application software 110 may generate one or more computational transactions for distributed execution by the one or more processors 120A-120N distributed over the computer network. A computational transaction is a computational task which takes a measurable amount of CPU time. For example, the granularity of a computational transaction may be about 5 milliseconds. The granularity of a computational transaction may be reduced over time as better networking protocols and higher speed computer interfaces become available.

The computer system 100 may be referred to as the master computer system with the master application software or master software. The master software or simply "master" is the main instance of the software system which may be initially executed by a user. The master software instantiates and controls execution of the slave software instances of the application software, initializes the slaves into the appropriate state, and provides them with the computational transactions to perform. The master collects the results of the computational transactions performed by the slaves when available.

The master may generate slave software instances of the application software for execution by other processors in the computer system 100 in independent memory spaces of memory 125 so that memory space is not shared. For example, processor 120A may execute the master instance of the application software 110 in a first memory space in memory 125 while processors 120B-120N may execute slave instances of the application software 110 in other independent memory spaces in memory 125. Alternatively, the master application software 110 may generate slave software instances of the application software 110 for execution by other processors in other computer systems 101A-101N in independent memory spaces of memory 125 within the distributed computer system 10.

The computer systems 101A-101N may be referred to as the slave computer systems in the distributed computer system 10. The slave computer systems have slave application software or slave software. The slave software or simply "slave" is a sub-instance of the software system. A slave instance of the application software is created by the master software and given the appropriate directions to perform a computational transaction. The slave software is a copy of the master software but under the control of the master software executing on the master computer system 100. That is, a copy of the application software 110 in a computer system is duplicated and loaded into memory for each processor within each computer system 100, 101A-101N so that they each can be independently executed without sharing memory. For example, the computer system 101B has two processors 120A-120B. Two copies of the application software 110 as illustrated may be read into memory 125 to independently execute computational transactions using the two processors 120A-120B. Using multiple processors to execute multiple copies of the same application, regardless of the location of the multiple processors (e.g., whether in the same computer or different computers), is referred to as multiple processing herein. The memory 125 will be split into two independent memory portions for the respective processors 120A-120B by the operating system 115. The master application running on the master computer system 100 may issue computational transactions to the slave applications running on a plurality of computer systems 100, 101A-101N to perform distributed parallel processing or distributed computing.

In one embodiment of the invention, the copies or instances of the application software 110 is an integrated circuit (IC) design program to design an integrated circuit product, such as a logic verifier, simulator, and/or timing analyzer; a logic synthesizer and optimizer; a placement and routing tool; a floor planner, a mask layout design tool; an extractor; a delay calculation tool or timing analyzer; an electrical rule check (ERC) program; a layout design rule check (DRC) program; a power analyzer; a thermal analyzer; or any other IC design tool. With distributed computing, the overall time for the IC design program to perform work on an IC design may be reduced so that time to market of an integrated circuit may be reduced.

In some embodiments of the invention, computational transactions are distributed to run in parallel on multiple computers. Multiple copies of the same software are executed in a master-slave execution manner on multiple computers having multiple processors with one copy on one computer acting as a master. Each of the computers in the network communicates in an efficient fashion to exchange tasks and results. In other embodiments of the invention, computational transactions are executed in a master-slave execution manner in one computer system with a plurality of processors using a plurality of copies of an application program with one copy of the application program acting as a master.

Figure 2:
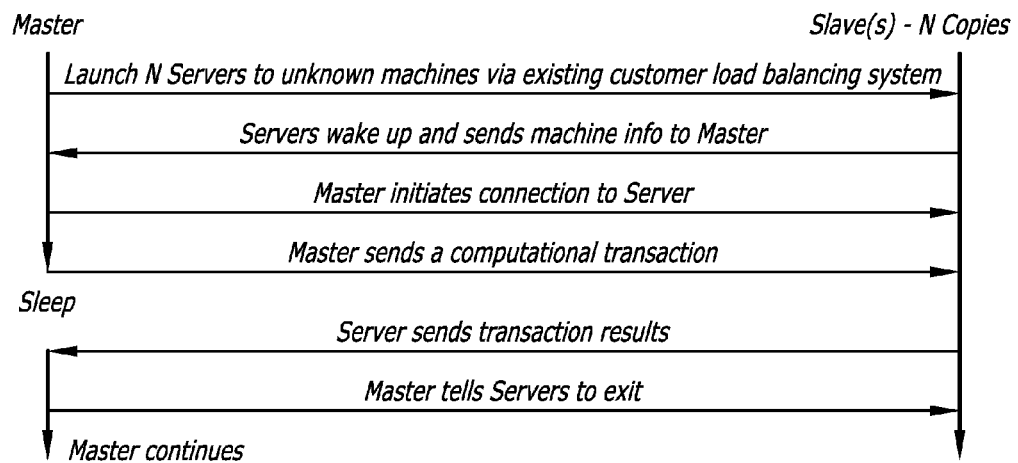
FIG. 2 is a diagram showing communication between a master application program and slave application programs.

Referring now to FIG. 2, a diagram illustrating communication between a master application program and slave application programs is now described. Each of the horizontal lines between the master and slave(s) illustrates a communication event such by way of a network socket.

Initially, the master computer system (the "master") launches N servers to unknown machines or computer systems via a load balancing system. Each of the N servers (the slave computer systems or "slaves") wakes up and sends their machine information to the master. The master initiates a connection to each server to which it desires to send computational transactions to perform the computational loop.

The master then sends computational transactions to one or more of the slaves. In order to send one computational transaction, the master converts the computational transaction into a compact message (at the master) which is then sent to a slave instance of the program. The slave interprets the message in conjunction with its state and performs the requested task. The master may also keep track of the message being sent to each slave.

After sending computational transactions to the available slaves, the master may go into a sleep mode waiting for results from the slaves. Alternatively, the master may perform computational transactions on its own with its available processors while waiting for results from the slaves. An interrupt driven architecture may be used to control the slaves. Here, unless the master is performing some local computation, it will be sleeping when waiting for results from the slaves. This approach enables the master to handle a large number of slave processes since only processes which have produced results for the master need to be handled.

After completing a computational transaction, the server or slave computer sends the transaction results to the master.

After receiving the results of a computational transaction, the master may tell a server to exit if there are no further computational transactions to perform. The master may continue sending computational transactions to the slaves until all the tasks comprising the computational loop are completed. The master then assembles the results of computational transactions together and continues executing further instructions of the master application software.

Computational Loops

The application software 110 may have one or more computational loops. A computational loop is a section of the software system that requires repeating the same task a large number of times with potentially different sets of data. Each task is independent or semi-independent from the next in the loop. Each task typically requires a threshold of computing power. A large software system may possess a plurality of computational loops. FIG. 6A illustrates an exemplary computational loop 600A written in C++ programming language prior to it's unrolling for multi-processing.

One processor often repetitively executes the computational loop to perform the same task over and over again in a serial fashion. However, the serial execution of a computational loop by one processor can delay the final results of the application software. In order to reduce the execution time of application software, it is desirable to distribute the execution of a computational loop to more than one processor and/or more than one computer system. Generally, some embodiments of the invention make a computational loop in the software system run faster by distributing the work being done in that loop to multiple instances of the same software running on a distributed computer network. In order to do so, the computation loops in the application software are unrolled into master code for the master program and slave code for the one or more instances of slave programs. Each instance of the application software includes both the master code and the slave code so that a user may invoke the application software initially as a master on any computer system. The master program instantiates multiple copies of the application software as the slaves under control of the master.

Referring now to FIG. 3A, consider that a computational loop exists in a software system. FIG. 3A illustrates pseudo-code for an exemplary non-parallel implementation of a computational loop to perform compute transactions. The computational loop may be indicated by different programming language commands such as a "while" command, a "for" command, a "do" command or a "repeat—until" command, for example.

FIG. 3B illustrates pseudo-code that may be added into the application software and executed by the master program to distribute computational transactions of a computation loop to slave programs. FIG. 3C illustrates pseudo-code that may be added into the application software and executed by one or more slave programs in order to perform a computational transaction associated with a single pass through the computational loop. Both the master code and the slave code are added into the application program in order to modify it to support multi-processing and/or distributed parallel processing. The copy of the application program initially executed by a user is the master program. The one or more copies of the application program instantiated by the master program are the slave programs.

Figure 4A:
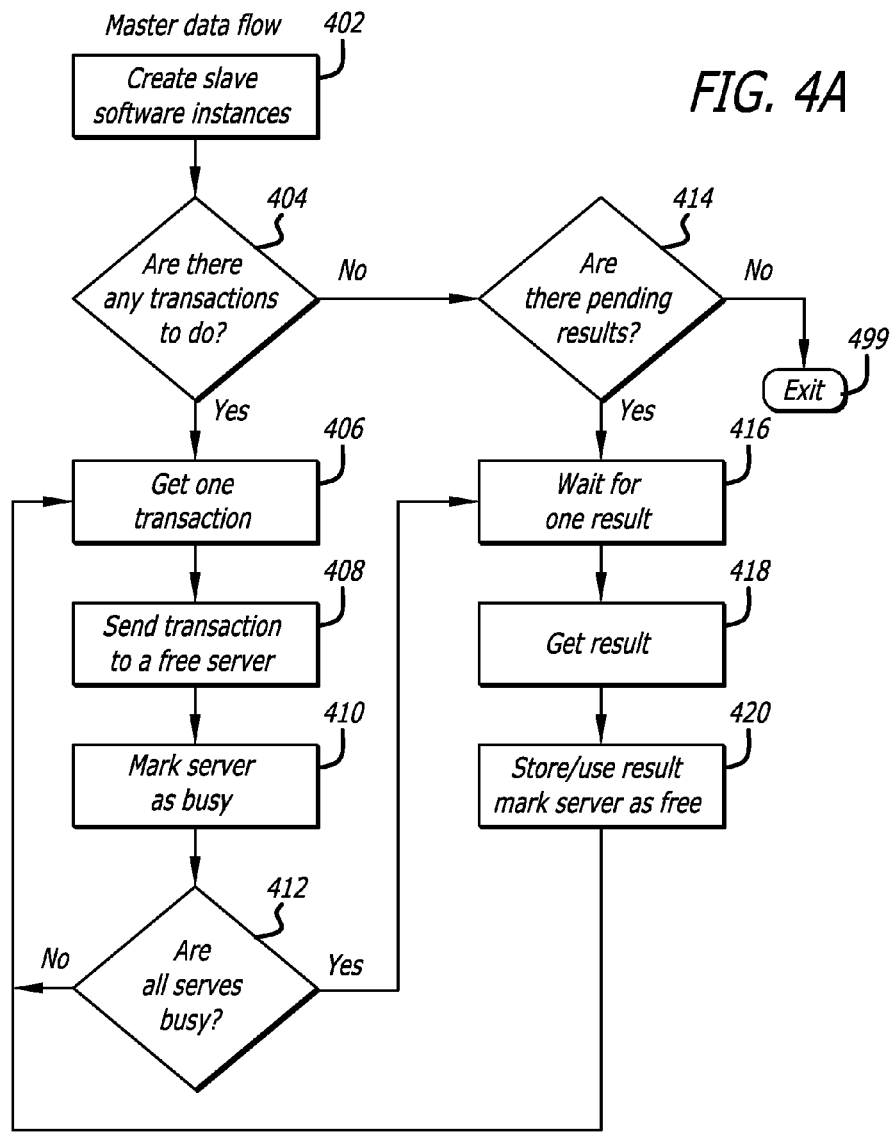
FIG. 4A is a flow chart of a method performed by a master application program for processing a loop of compute transactions via multi-processing and/or distributed parallel processing.

Referring now to FIGS. 3B and 4A, before a loop of computation transactions is begun; multiple copies of the application software are instantiated across the computer network (402). The primary copy is referred to as the master and the secondary copies as slaves. The pseudo-code initially makes copies of the application program in order to make slave instances so that each can perform a computational transaction of a computational loop. The master brings the one or more slaves into a state ready to accept computational transactions from the master.

Then, a determination is made if there are any computational transactions of a computational loop to perform (404).

If there are computational transactions to perform, the master then gets one computational transaction ready to send to a slave (406).

While computational transactions for the computational loop are pending, the master program sends a computational transaction to free or available servers or computers where a copy of the application program was instantiated as a slave instance (408). Instead of running the computational transactions at the master, the master sends them to the free or available slaves.

The master keeps track of whether or not the servers are busy with a computational transaction as the number of computational transactions may exceed the available servers with slave instances. The master marks a server as busy after it has sent a computational transaction for it to execute with the slave instance of the application program (410). A determination is made if all servers are busy (412). If all servers are busy (412), results are most likely pending and the master waits for one result of a computational transaction from a slave instance of the application program (416).

Moreover, if there are no computational transactions to perform (404), a determination is made if there are pending results (414). If results are pending, the master waits for one result of a computational transaction from a slave instance of the application program (416). During the wait by the master for results from the busy slaves, the master may choose to perform one or more of the remaining computational transactions locally instead of waiting to send them to the slave instances.

If there are no further computational transactions (404) and there are no results pending (414), the master may exit (499) and terminate the slave instances of the application program. Alternatively, the master may choose to keep the slave instances alive for further computational work, such as for other computational loops. Otherwise, the process continues until all the required compute transactions in the computational loops are finished.

Once a result is received by the master (416), it is used and/or stored in storage (420), such as memory or disk storage, and the server may be indicated as being free to perform other computational transactions. With independent or semi-independent computational transactions, the results from the slave instances of the programs can be sent out of order to the master. The master may store, assemble, order, and/or perform final computations on the results to obtain a final overall result for the computational loop. Once results are received from a particular slave, the master may then send it another computational transaction to perform. This process may be repeated until all the transactions have been performed.

Figure 4B:
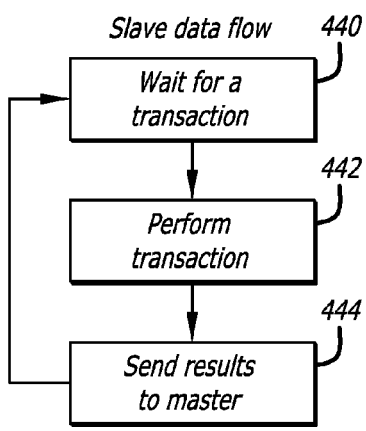
FIG. 4B is a flow chart of a method performed by a slave application program to process one compute transaction of a computational loop to support multi-processing and/or distributed parallel processing.

Referring now to FIGS. 3C and 4B, each of the one or more slave instances of the application program wait for a computational transaction from the master (440). After receiving a computational transaction from the master, the computational transaction is performed (442). A computational transaction may be one or more commands or instructions of a single iteration or pass through the computational loop. After completing a computational transaction, the result thereof is sent to the master by the slave instance at the server (444). The slave instance then goes back to waiting for the next computational transaction to be sent by the master to it (440).

It is not necessary that the slave instances of the software system be in the exact same state as the master instance since they are limited to performing the computational transactions demanded by the master. Without having the master and all slaves in the same state, memory space may be more efficiently used and the total runtime can be further improved.

Software Modifications

Pre-existing software applications may be rewritten with minimally invasive changes so that computational transaction in computational loops may run in parallel on multiple processors and/or multiple computers. The decision to unroll a computational loop and modify the application program by adding master and slave code may depend upon a threshold related to the compute transaction size. The threshold of the compute transaction size is dependent on the computational overhead required to send the task to the slave and collate the results received and can vary with network speed, locality of the slaves in the network space etc.

Figure 5:
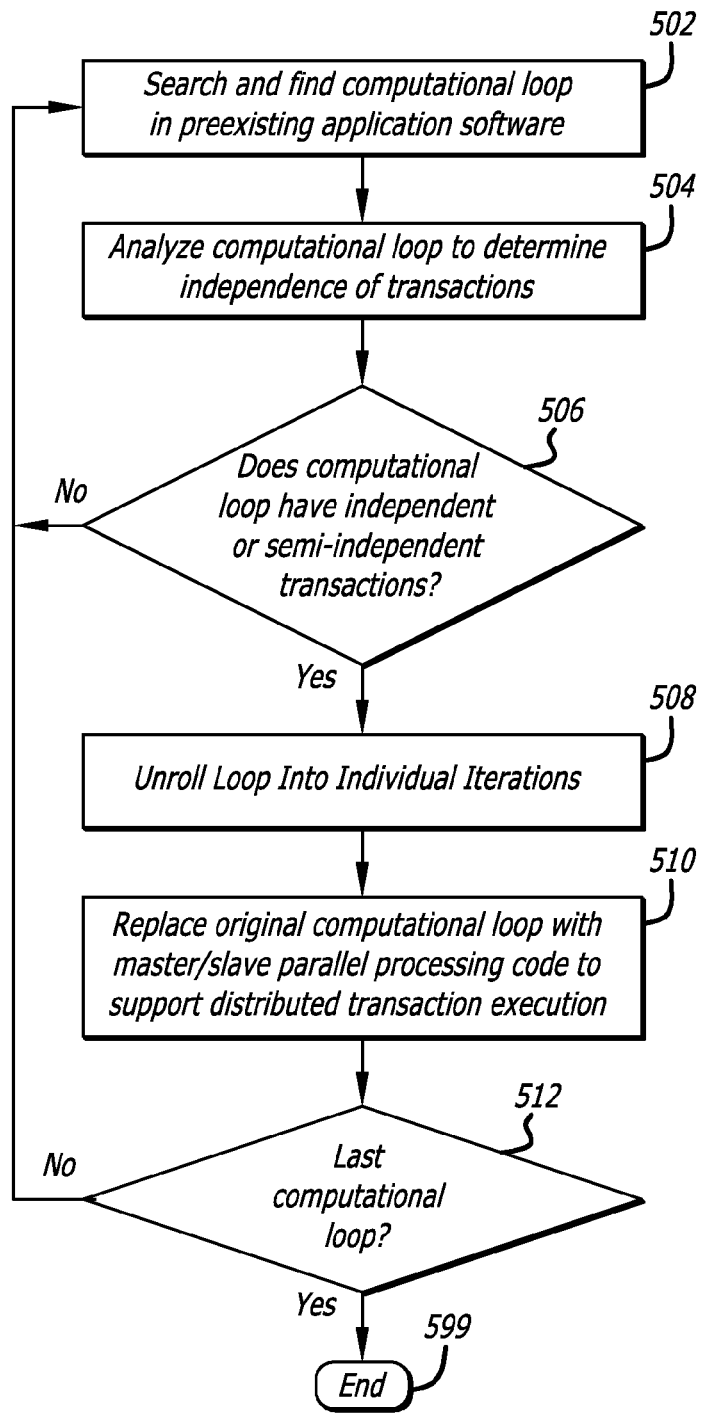
FIG. 5 is a flow chart of a method of modifying an application program to include master and slave functionality to support multi-processing and/or distributed parallel processing.

Referring now to FIG. 5, a flow chart of a method of modifying an application program to include master and slave functionality to support master-slave execution of computational loops with a plurality of application programs is illustrated.

At block 502, a search is made in a pre-existing application program to find a computational loop.

At block 504, the computation loop that is found is analyzed to determine the independence of the computational transactions in the loop. The computational loop is analyzed to see if an iteration is independent/semi-independent from the next iteration of computational transactions or if the results of the prior loop are needed for the computational transactions of the next loop.

The computational loop may also be analyzed to determine if it meets the threshold level of compute transaction size. Computational loops typically exceed the threshold level of compute transaction size such that it is worthwhile to add the master and slave code so that it can be computed with multi-processing and/or distributed parallel processing. Also it is sufficient that the average compute transaction size exceeds the threshold level, even if some of the individual transactions do not.

Next at block 506, a determination is made if the computational loop has independent or semi-independent computational transactions. If so, the process goes to block 508. If not, the process goes back to block 502 to search for another computation loop in the pre-existing application program.

At block 508, the computational loop is unrolled into individual iterations of transactions by forming the slave code to support multi-processing and/or distributed parallel processing. The master code is formed to manage the multi-processing and/or distributed parallel processing of the computational loop. The master code and slave code was described previously with reference to the pseudo-code respectively illustrated in FIGS. 3B and 3C.

At block 510, the master code and the slave code is added into the application program replacing the original computational loop in order to support multi-processing and/or distributed parallel processing and single transaction execution of a loop in the computational loop by a slave instance.

At block 512, a determination is made if the last computational loop was processed or if there are any others in the pre-existing application program. If it is not the last computation loop, the process goes back to block 502 and searches for the next computational loop. If the last computational loop was processed, the process may end at block 599.

Exemplary Software Modifications

Reference is now made to FIGS. 6A-6C illustrating exemplary modification to a computational loop in a pre-existing application program. While the code illustrated in FIGS. 6A-6C is in C++ programming language, modifications to computational loops in pre-existing application program written in other computer programming languages may be made to implement multi-processing and distributed parallel processing of computational loops.

FIG. 6A is code for an exemplary procedure in an application program with a computational loop without multi-processing and/or distributed parallel processing. Embodiments of the invention may be used to form master code and slave code within a modified application program for multi-processing of the exemplary procedure on one or more processors and distributed parallel processing over one or more computer systems. The exemplary procedure is a netlist reducer to reduce the complexity of a netlist of an electronic circuit for subsequent analysis.

In FIG. 6A, instruction 601 identifies structure "listOfNets" which stores a list of the nets to be reduced in the computational loop that follows. Instruction 602 initializes the list declared in instruction 601 by populating it with the actual nets, for example.

Instruction 604 forms the computational loop for the compute transactions of instructions 605-611. The compute transactions of instructions 605-611 may be unrolled into a single iteration or pass of transactions for a slave instance of the application program to perform. The instructions 605-611 are serially repeated for every iteration or pass of the loop while the variable "i" is less than the total number of nets as defined by the value returned by "nets.count( )". After completing a single iteration of instructions 605-611, the variable "i" is incremented by one. The same processor is typically used to serially repeat the instructions 605-611 for every iteration or pass through the computational loop. In this case, each iteration through the instructions 605-611 is independent from the next such that the computational loop may be unrolled with the computational transactions distributed to slave instances of the application program.

Instruction 605 declares a software component of the type "reductionEngine" named "reducer". Instruction 606 declares a data structure of the type "reducedNetworkModel" named "model".

Instruction 607 gets one net for processing as returned by "nets.element(i)". The application program may be provided with a pointer into a database where to read the information about the net, such as the parasitic resistances and capacitances associated with the net.

Instruction 608 sets computational options as to how a selected net should be reduced. Instruction 609 initializes the software component responsible for the reduction ("reducer") with relevant data about the net in question.

Instructions 610-611 compute the reduced order model for the selected net. Instruction 610 calls the reduction engine to compute the reduced order model for the selected net. Instruction 611 annotates the reduced order model back into the net of the circuit.

FIG. 6B illustrates the master code implementation for the exemplary procedure of FIG. 6A and FIG. 6C illustrates the slave code implementation for the exemplary procedure of FIG. 6A. The master code and the slave code is added to the application program to replace the code of FIG. 6A.

In FIG. 6B, instruction 601 identifies the structure "listOfNets" which stores a list of the nets to be reduced via multi-processing and/or distributed parallel processing. Instruction 622 defines the slave instances of software copies "listOfSofwareCopies" as the available computing engines "engines" for the master to use. Instruction 602 initializes the list declared in instruction 601 by populating it with the actual nets, for example.

Instruction 623 starts up the different available slave processes at the slave computers or on different processors of the master computer by initializing each. Note that for this particular computational loop, the slaves need not read and load any data from a database. The slaves can execute computational transactions based on the commands sent over the networking sockets. In other cases, the slaves may read and load some or all of the design data for an integrated circuit design.

Instruction 604' forms the computational loop but with multi-processing and/or distributed parallel processing of the computational transactions of the original computational loop. One or more of the instructions below instruction 604', instruction 606 through instruction 630B, may be executed during a single iteration or pass. Instruction 604' is similar to instruction 604 but with different instructions and conditional statements within its loop.

Instruction 606 declares a data structure of the type "reducedNetworkModel" named "model". Instruction 624 defines the pointer variable "*reductionJob" to be a character variable. This variable will be used later to store a computational transaction for transmission via the available network to one of the slaves.

Instruction 607 gets one net for processing as defined by "nets.element(i)". The application program may be provided with a pointer into a database where to read the information about the net, such as the parasitic resistances and capacitances associated with the net.

Instruction 625 creates a job for a slave instance to work on the selected net.

Instructions 626,627, 628A generally send the created job to a slave instance if it is free to perform work. Instruction 626 checks to see if any one of the slaves is free on the list of available slave computers. If so, instruction 627 gets the address of a free slave and 628A dispatches the created job to the free slave. Instruction 629A then marks the slave as being busy. Instruction 630A stores the net name associated with the job sent to the slave and stores the slave name or server ID of the slave so that the master keeps track of which slave got which net.

If no slave instance is free to perform work, the instructions 632A-634A,611A,635A,636A,628B-630B below the else statement 631 are executed by the master.

Instruction 632A causes the master to wait for one result from the slave instances.

Instruction 633A gets the model for the result and saves it as "model".

Instruction 634A gets the net for the result and saves it as "net".

Instruction 611A annotates the reduced order model back into the net of the circuit.

Instruction 635A gets the slave from which the result was obtained.

Instruction 636A then marks the slave as being free.

Instruction 628B sends the current reduction job to the slave.

Instruction 629B marks the slave as being busy.

Instruction 630B then stores the net name associated with the job sent to the slave and stores the server ID of the slave.

This ends the computational loop established by instruction 604'. If "i" is equal to the value returned by nets.count( ) function, the master executes the while instruction 637 and instructions 632B-634B,611B,635B,629C underneath it. This is the case where all jobs have been sent out by the master to the slave instances but they have not yet finished. The master is still waiting for results from one or more of the slave instances. Instructions 632B-634B,611B,635B,629C were described previously but with reference to a different instance of reference number. Those descriptions are not repeated here for reasons of brevity but instead are incorporated here by reference.

After all the jobs have finished and the results from the slave instances have all been received by the master, the slave instances may be terminated by the killSlaves( ) instruction 639 being executed by the master. Alternatively, the killSlaves( ) instruction 639 may be conditioned upon whether or not there is other computational loops or other work that the master can send to the slave instances.

As previously mentioned, FIG. 6C illustrates the slave code implementation for the exemplary procedure of FIG. 6A which is added along with the master code to the application program to replace the code of FIG. 6A.

In FIG. 6C, the forever instruction 650 has the slave instance always at the ready to execute instructions 651-655 below it.

Instruction 651 causes each slave instance to listen for command from the master. Each slave instance sleeps until it gets something from the master instructing it to take action.

Once the appropriate command is received, the instruction 653 is executed and returns the result as a string which is stored by the character variable "*result".

In this example of slave code, the commands being received are commands to reduce a net. All the information about the net being reduced is encapsulated in the command itself such that the slave instance may not need to look for further information.

Instruction 654 causes the slave to execute the "doCommand" below and save the results into the variable "result".

Instruction 655 causes the slave to send the result back to the master instance of the application program.

Instructions 656-657 introduces the subroutine "doCommand" which consists of instructions 605-606, 658-662, 610', 663-664 below it. This subroutine can reduce a given net and return the results as a string back to the caller.

Instruction 605 declares a software component of the type "reductionEngine" named "reducer". Instruction 606 declares a data structure of the type "reducedNetworkModel" named "model".

Instruction 658 defines "*optionCmd" and "*initCmd" to be character variables.

The command the slave is to execute may be broken up into component parts. This may not be necessary. FIG. 6C illustrates the doCommand broken up into its relevant pieces for purposes of clarity.

Instruction 659 parses the "reductionCmd" that is received to set the value of the variable "optionCmd". The "optionCmd" has settings to initialize computational options.

Instruction 660 parses the "reductionCmd" that is received to set the value of the variable "initCmd". The "initCmd" contains information about the net required to generate a reduced model for it.

Instruction 661 sets computational options as to how a selected net associated with the "reductionCmd" variable should be reduced.

Instruction 662 further sets information about the selected net so a reduced model for it may be generated.

Instruction 610' computes the reduced order model for the selected net. It calls the reduction engine to compute the reduced order model for the selected net.

Instruction 663 converts the reduced order model into a character string as the results generated by the slave instance.

The return result instruction 664 returns the result of the doCommand to the instruction 654. The results are then sent to the master by the instruction 655.

A pre-existing application program may have one or more computational loops that may be modified so that they can be performed using multi-processing and/or distributed parallel processing.

Figure 7B:
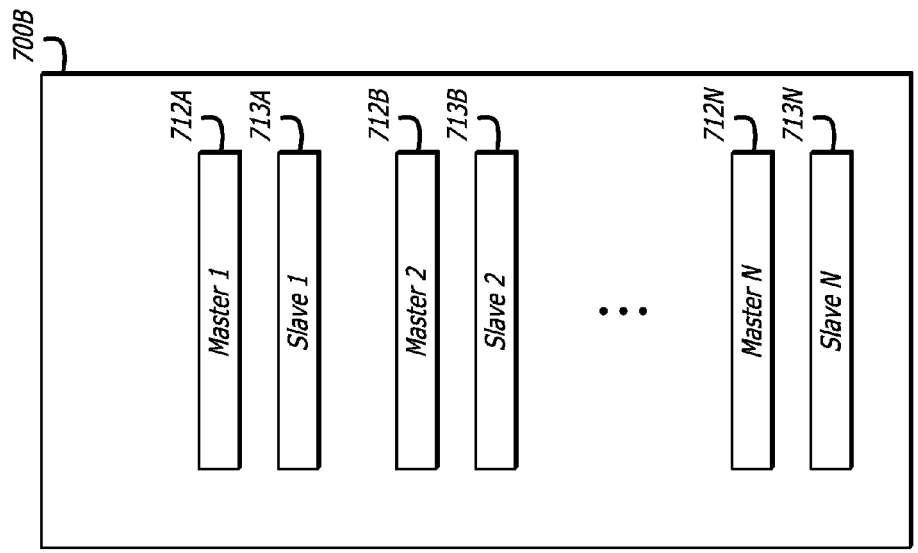
FIG. 7B illustrates a block diagram of the modified application program with master and slave code to support multi-processing and/or distributed parallel processing of the one or more computational loops.
Figure 7A:
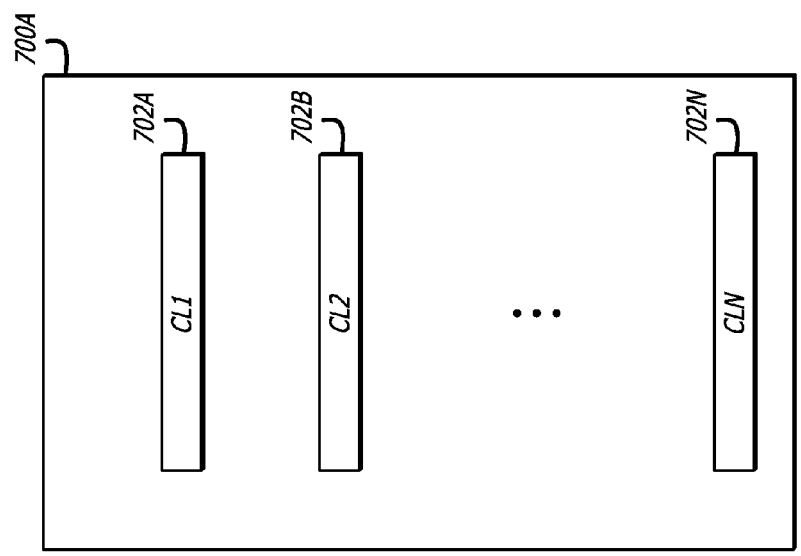
FIG. 7A illustrates a block diagram of a pre-existing application program with non-parallel implementations of one or more computational loops to perform compute transactions.

Referring now FIG. 7A, a block diagram of a pre-existing application program 700A is illustrated. The pre-existing application program 700A includes non-parallel implementations of one or more computational loops CL1 702A-CLN 702N to perform computational transactions.

In contrast, FIG. 7B illustrates a block diagram of the modified application program 700B. The modified application program 700B includes one or more master code sections 712A-712N and respective one or more slave code sections 713A-713N added into the application program with the non-parallel implementations of one or more computational loops CL1 702A-CLN 702N removed. That is, the pairing of each master code section 712A-712N with each respective slave code section 713A-713N replaces each respective computational loop 702A-702N in the pre-existing application program 700A. The one or more master code sections 712A-712N and the respective one or more slave code sections 713A-713N support multi-processing and/or distributed parallel processing of the one or more computational loops in a computer network.

Conclusion

There are a number of advantages to modifying applications with computational loops so that the computational transactions can be performed in a multi-processing and/or distributed parallel processing manner. With the computational transactions of a computational loop performed by different computer systems or servers over the network, more work can be done in parallel by additional processors thereby reducing the overall time to complete execution and obtain final results from an application program. The software changes to implement and replace computational loops with the master and slave codes described herein are minimally invasive and do not substantially impact developer productivity. No portions of the application program are required to be thread-safe simplifying the modification of the application program. The application program, modified with the master and slave code in the manner described herein, scales seamlessly to potentially hundreds of microprocessors distributed over a large computer network. The distributed parallel processing lends itself to be used on a server farm with a large number of cheap computer systems as opposed to a small number of multi-CPU machines which tend to be more expensive. Unrolling the computational loop into a single iteration or pass of transactions enables the developer to debug problems in the software one instance at a time when problems are encountered so that it is easier to maintain by large and diverse development teams particularly when the software system is rapidly evolving. The methods disclosed herein are an efficient approach to making computational portions of large legacy software run in parallel for increased performance.

When implemented in software, the elements of the embodiments of the invention are essentially the code segments to automatically perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal may include any signal that can propagate over a transmission medium such as electronic network channels (LAN or WAN), optical fibers, air, electromagnetic, RF links, etc. The code segments may be downloaded via computer networks such as the Internet, Intranet, etc.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. Instead, the embodiments of the invention should be construed according to the claims that follow below.

What is claimed is:

1. A method of modifying a pre-existing application program for multi-processing or distributed parallel processing associated with designing integrated circuits, the method comprising:
   searching an application program for a computational loop that iterates over nets within an integrated circuit;
   analyzing the computational loop to determine independence of the computational transactions of the computational loop;
   replacing the computational loop in the application program with master code and slave code to provide master-slave execution of the computational loop in response to the analyzing of the computational loop to determine independence of the computational transactions of the computational loop, wherein the master code is configured to send a first single iteration of computational transactions of the computational loop to the slave code, wherein the first single iteration of computational transactions processes a first net within the integrated circuit;
   analyzing the computational loop to determine if it meets a threshold level of compute transaction size for replacement by the master code and the slave code; and
   wherein the replacing of the computational loop with the master code and the slave code is further responsive to the computational loop meeting the threshold level of compute transaction size; and
   wherein one or more of the searching, the analyzing, and the replacing are automatically performed with a processor, wherein the replacing includes writing the master code to a first memory space for a first processor and writing the slave code to a second memory space for a second processor, wherein no memory space is shared among the first processor and the second processor.

2. The method of claim 1, wherein
   the replacing of the computational loop with the master code and the slave code includes
   unrolling a loop of computational transactions into a single sequence of computational transactions associated with a single iteration through the computational loop to support multi-processing or distributed parallel processing of the computational loop.

3. The method of claim 2, wherein
   the replacing of the computational loop with the master code and the slave code further includes
   adding instructions to the application program to manage the multi-processing or distributed parallel processing of the computational loop.

4. The method of claim 3, wherein
   the adding instructions to the application program to manage the distributed parallel processing of the computational loop includes
   adding instructions to instantiate one or more slave instances of the application program over a computer network to perform the multi-processing or distributed parallel processing of the computational loop.

5. The method of claim 1, further comprising:
   determining if there is a second computational loop in the application program; and
   repeating the analyzing and the replacing for the second computational loop.

6. The method of claim 1, wherein
   the replacing the computational loop with master code and slave code is based on the independence of the computational transactions of the computational loop.

7. The method of claim 6, wherein
   the independence of the computational transactions in the computational loop is insufficient if results of a prior iteration of the computational loop are necessary to perform the computational transactions of a following iteration of the computational loop such that the computational loop is not replaced with master code and slave code.

8. The method of claim 6, wherein
   the independence of the computational transactions in the computational loop is sufficient if the computational transactions of the computational loop are at least semi-independent.

9. A computer system comprising:
   a computer network;
   a master processor coupled to the computer network, the master processor configured to execute master code including a first copy of a modified application program configured for designing integrated circuits for multi-processing, wherein the master code is written into a first memory space for the master processor;
   a first slave processor coupled to the computer network, the first slave processor configured to execute slave code including a second copy of the modified application program for multi-processing, wherein the slave code is written into a second memory space for the slave processor;
   wherein the master code is configured to send a first single iteration of computational transactions of a computational loop to the slave code, wherein the first single iteration of computational transactions processes a first net within an integrated circuit;
   wherein the master processor is further configured to analyze the computational loop to determine if it meets a threshold level of compute transaction size for replacement by the master code and the slave code;
   wherein the master processor is further configured to replace the computational loop with the master code and the slave code in response to the computational loop meeting the threshold level of compute transaction size; and
   wherein no memory space is shared among the master processor and the slave processor.

10. The computer system of claim 9, further comprising:
    a second slave processor coupled to the computer network, the second slave processor configured to execute a third copy of the modified application program modified for multi-processing; and
    wherein the first copy of the modified application program is configured to send a second single iteration of computational transactions of the computational loop to the third copy of the modified application program, wherein the second single iteration of computational transactions processes a second net within the integrated circuit.

11. The computer system of claim 9 comprises a distributed computer system for distributed parallel processing, and wherein
  the computer network is a local area network or a wide area network for network communications between computers,
  the master processor is in a master computer, and
  the first slave processor is in a first slave computer separate from the master computer.

12. The computer system of claim 10, wherein
  the master processor, the first slave processor, and the second slave processor are in a master computer for multi-processing.

13. The computer system of claim 10 comprises a distributed computer system for distributed parallel processing, and wherein
  the master processor is in a master computer, and
  the first slave processor and the second slave processor are in a first slave computer separate from the master computer for multi-processing therein.

14. The computer system of claim 9, wherein
  each single iteration of computational transactions of the computational loop are at least semi-independent from other iterations of the computational loop.

15. A computer program product configured for multi-processing or distributed parallel processing associated with designing integrated circuits, the computer program product comprising:
  a non-transitory computer usable medium having application software embodied therein including
  computer readable program code including master code configured to execute on a first processor with a first memory space and manage a computational loop and generate one or more slave instances of the application software, wherein each iteration of the computational loop processes a net within an integrated circuit;
  computer readable program code including slave code configured to execute on a second processor with a second memory space and perform a single iteration of computational transactions of the computational loop;
  computer readable program code configured to execute on the first processor and receive results of the computational transactions from the one or more slave instances of the application software;
  computer readable program code configured to execute on the first processor and analyze the computational loop to determine if it meets a threshold level of compute transaction size for replacement by the master code and the slave code;
  computer readable program code configured to execute on the first processor and replace the computational loop with the master code and the slave code in response to the computational loop meeting the threshold level of compute transaction size; and
  wherein no memory space is shared among the first processor and the second processor.

16. The computer program product of claim 15, wherein
  the application software embodied in the non-transitory computer usable medium further includes
  computer readable program code configured to execute on the first processor and generate a final result for the computational loop in response to the received results of the computational transactions from the one or more slave instances of the application software.

17. The computer program product of claim 15, wherein
  the application software embodied in the non-transitory computer usable medium further includes
  computer readable program code configured to execute on the first processor and send single iterations of computational transactions to the one or more slave instances of the application software; and
  computer readable program code configured to execute on the second processor and wait for a single iteration of the computational transactions sent by the computer readable program code executed on the first processor.

18. The computer program product of claim 17, wherein
  the application software embodied in the non-transitory computer usable medium further includes
  computer readable program code configured to execute on the second processor and send results of the single iteration of the computational transactions to the first processor.

19. The computer program product of claim 15, wherein
  each of the single iterations of the computational transactions of the computational loop are at least semi-independent from each other.

20. The computer program product of claim 15, wherein
  the application software embodied in the non-transitory computer usable medium is an electronic computer aided design program for designing integrated circuits.

* * * * *